(12) United States Patent
Suresh

(10) Patent No.: US 11,574,272 B2
(45) Date of Patent: Feb. 7, 2023

(54) SYSTEMS AND METHODS FOR MAXIMIZING EMPLOYEE RETURN ON INVESTMENT

(71) Applicant: O.C. Tanner Company, Salt Lake City, UT (US)

(72) Inventor: Padmashri Suresh, Ontario (CA)

( * ) Notice: Subject to any disclaimer, the term of this patent is extended or adjusted under 35 U.S.C. 154(b) by 42 days.

(21) Appl. No.: 16/381,194

(22) Filed: Apr. 11, 2019

(65) Prior Publication Data

US 2020/0327475 A1 Oct. 15, 2020

(51) Int. Cl.
| | |
|---|---|
| *G06Q 10/06* | (2012.01) |
| *G06N 20/00* | (2019.01) |
| *G06N 5/04* | (2006.01) |
| *G06Q 10/10* | (2012.01) |

(52) U.S. Cl.
CPC ....... *G06Q 10/06393* (2013.01); *G06N 5/046* (2013.01); *G06N 20/00* (2019.01); *G06Q 10/105* (2013.01)

(58) Field of Classification Search
None
See application file for complete search history.

(56) References Cited

U.S. PATENT DOCUMENTS

| | | | | |
|---|---|---|---|---|
| 10,984,361 | B1 * | 4/2021 | Shook | A63F 13/79 |
| 2002/0019765 | A1 * | 2/2002 | Mann | G06Q 10/063112 |
| | | | | 705/7.14 |
| 2003/0004748 | A1 * | 1/2003 | Coleman | G06N 5/02 |
| | | | | 705/320 |
| 2003/0036956 | A1 * | 2/2003 | Karas | G06Q 30/02 |
| | | | | 705/14.15 |
| 2003/0200142 | A1 * | 10/2003 | Hicks | G06Q 30/0226 |
| | | | | 705/14.27 |
| 2004/0230484 | A1 * | 11/2004 | Greenlee | G06Q 30/0214 |
| | | | | 705/14.27 |
| 2007/0156530 | A1 * | 7/2007 | Schmitt | G06Q 30/0215 |
| | | | | 705/14.17 |

(Continued)

FOREIGN PATENT DOCUMENTS

| | | | | |
|---|---|---|---|---|
| CA | 2977185 | A1 * | 2/2018 | G06F 17/153 |

OTHER PUBLICATIONS

Deci, Edward L., Richard Koestner, and Richard M. Ryan. "Extrinsic rewards and intrinsic motivation in education: Reconsidered once again." Review of educational research 71.1 (2001): 1-27 (Year: 2001).*

(Continued)

*Primary Examiner* — Shelby A Turner
(74) *Attorney, Agent, or Firm* — Michael F Krieger; Kirton McConkie

(57) ABSTRACT

Systems and methods of utilizing employee recognition programs to maximize employee return on investment. To maximize the employee return on investment effect of the available recognition products at a desired cost to the employer, systems and methods rank recognition categories and/or products, prescribing the top category and/or product or the top categories and/or products that will be beneficial in optimizing employee return on investment of an organization. The systems and methods for prescribing the category and/or product or categories and/or products can provide an estimate of how employee return on investment will be impacted by the prescribed recognition.

7 Claims, 8 Drawing Sheets

Development Baselined

Feedback loop to update model predictions and prescriptions as new data becomes available

(56) References Cited

U.S. PATENT DOCUMENTS

| | | | | |
|---|---|---|---|---|
| 2008/0004922 | A1* | 1/2008 | Eder | G06Q 30/0202 |
| | | | | 705/7.29 |
| 2009/0138342 | A1* | 5/2009 | Otto | G06N 5/025 |
| | | | | 706/45 |
| 2009/0271252 | A1* | 10/2009 | AmEnde | G06Q 10/06398 |
| | | | | 705/7.42 |
| 2010/0169160 | A1* | 7/2010 | Wu | G06Q 30/02 |
| | | | | 705/14.4 |
| 2011/0307303 | A1* | 12/2011 | Dutta | G06Q 10/00 |
| | | | | 707/E17.014 |
| 2012/0323662 | A1* | 12/2012 | Otto | G06N 5/025 |
| | | | | 705/14.25 |
| 2013/0246148 | A1* | 9/2013 | Ross | G06Q 30/0224 |
| | | | | 705/14.25 |
| 2013/0304686 | A1* | 11/2013 | Antin | G06Q 30/02 |
| | | | | 706/46 |
| 2015/0186817 | A1* | 7/2015 | Kim | G06Q 10/0635 |
| | | | | 705/7.28 |
| 2015/0206166 | A1* | 7/2015 | Fletcher | G06Q 10/06 |
| | | | | 705/14.27 |
| 2015/0242793 | A1* | 8/2015 | Williams | G06Q 10/06398 |
| | | | | 705/7.42 |
| 2015/0269244 | A1* | 9/2015 | Qamar | G06Q 10/06398 |
| | | | | 705/7.42 |
| 2016/0086222 | A1* | 3/2016 | Kurapati | G06Q 30/0261 |
| | | | | 705/14.53 |
| 2016/0140463 | A1* | 5/2016 | Ezry | G06Q 10/0639 |
| | | | | 705/7.38 |
| 2016/0140599 | A1* | 5/2016 | Castro da Silva | G06Q 30/0269 |
| | | | | 705/14.41 |
| 2016/0225011 | A1* | 8/2016 | Shah | G06Q 20/3278 |
| 2016/0239807 | A1* | 8/2016 | Creighton | G06Q 10/1057 |
| 2017/0256172 | A1* | 9/2017 | Kil | G06Q 50/205 |
| 2018/0330303 | A1* | 11/2018 | Mosley | G06Q 10/06398 |
| 2019/0012167 | A1* | 1/2019 | Boss | G06F 8/70 |
| 2020/0074492 | A1* | 3/2020 | Scholl | B60K 35/00 |

OTHER PUBLICATIONS

S. Sethunga and I. Perera, "Impact of Performance Rewards on Employee Turnover in Sri Lankan IT Industry," 2018 Moratuwa Engineering Research Conference (MERCon), 2018, pp. 114-119, doi: 10.1109/MERCon.2018.8421961. (Year: 2018).*

B. Barna and S. Fodor, "Gamification's Impact on Employee Engagement: Enhancing Employee Well-Being with a Cloud Based Gamified Team-Building Application," 2018 6th International Conference on Future Internet of Things and Cloud Workshops (FiCloudW) pp. 203-208, doi: 10.1109/W-FiCloud.2018.00039 (Year: 2018).*

\* cited by examiner

FIG. 4

| User key | Gender | Age | Salary | | Years of service |
|---|---|---|---|---|---|
| K1111 | M | 35-44 | 75-100K | | 5 |
| K1112 | F | 35-44 | 75-100K | | 5.2 |
| K1111 | M | 35-44 | 75-100K | ......... | 5 |
| K1111 | M | 35-44 | 75-100K | ......... | 5 |
| K1111 | M | 35-44 | 75-100K | | 5 |
| K1112 | F | 35-44 | 75-100K | ......... | 5.2 |

*FIG. 5*

Database of Recognition Transactions (Illustrating few columns)

| user_key | giver_key | recognition_type | ... | recognition_date_key |
|---|---|---|---|---|
| K1111 | K11111 | Excel | ... | 20150513 |
| K1111 | M1111 | ABC Award | ... | 20150703 |
| K1111 | M11110 | ABC Award | ... | 20130205 |
| K1111 | K1110 | XYZ Award | ... | 20150908 |
| K1111 | K1110 | XYZ Award | ... | 20150327 |
| K1111 | K11110 | ABC Award | ... | 20140925 |
| K1112 | M1112 | ABC Award | ... | 20150326 |

Illustration of some of the features engineered from recognition transaction database for user K1111.

| user_key (fkey) | num_recognitions_where_user_and_giver_share_mgr | num_recognitions_where_user_and_giver_are_in_diff_bu | ... |
|---|---|---|---|
| K1111 | 1 | 2 | ... |

Both the manager and the manager's manager appreciated the employee's work

Employees from different business units recognized the employee's contribution

*FIG. 6*

SYSTEMS AND METHODS FOR MAXIMIZING EMPLOYEE RETURN ON INVESTMENT

BACKGROUND OF THE INVENTION

1. Field of the Invention

The present invention relates to maximizing employee return on investment, and more particularly to systems and methods to utilize employee recognition programs to enhance employee return on investment.

2. Background and Related Art

One of the most significant costs to employers in many industries is the investment in employees. There are costs associated with training employees, paying employees, retaining employees (so as not to incur time lost training new employees and to maximize skill and efficiency of employees), providing benefits for employees, maximizing employee happiness and fulfillment, and a whole host of employee-related costs. Accordingly, it is important for employers to maximize the return they achieve in investments made in employees. Employers accordingly and typically wish to maximize retention (within the scope of available pay resources), performance, engagement, etc.

An often-underutilized method for improving the return on investment in employees is the use of recognition programs. Such programs may recognize employee achievements and the like, and seek to utilize recognition as a tool to improve employee satisfaction and fulfillment. Some employers believe that employee satisfaction and fulfillment will lead to increased retention and productivity, reduced losses due to illness and the like, and other benefits that will lead to increased employee return on investment. Unfortunately, current attempts to utilize employee recognition for motivation and employee return on investment have failed to permit employers to maximize the effect of recognition or to maximize employee return on investment.

BRIEF SUMMARY OF THE INVENTION

Implementation of the invention provides systems and methods for maximizing employee return on investment (ROI). Aspects of employee ROI that may be maximized include, without limitation, employee retention, employee performance, employee engagement, employee satisfaction, employee fulfillment, and the like. In particular, implementation of the invention relates to utilization of recognition programs to maximize employee ROI. Recognition programs may include a variety of products and may include tangible and electronic artifacts. Recognition programs may be used by employers and other employees to commend employees for workplace contributions and wins, to congratulate employees on milestones, and to recognize events such as birthdays and other significant life events, as well as work anniversaries and other work events.

According to certain implementations of the invention, an employee recognition program in which an employer and its employees participate may have a plurality of recognition categories and products. These recognition categories and products may be provided by a third party that provides recognition services to the employer. Accordingly, the employer may subscribe to a set of recognition products among the recognition products that are available from the recognition subscription service. The employer may select from among available recognition products those that the employer is willing to pay for and make available to its employees. In some instances, the employer may select to make all available recognition products available to its employees. In other instances, the employer may select a subset of available recognition products available to its employees. In some instances, the available recognition products include intangible recognition products such as electronic recognition products or artifacts. In other instances, the available recognition products include tangible recognition products that can be physically delivered to the employees. In further instances, the available recognition products include mixtures of intangible and tangible recognition products.

To maximize the ROI effect of the available recognition products at a desired cost to the employer, implementation of the invention utilizes systems and methods that rank recognition categories and/or products from among the available recognition categories and/or products selected by the employer to be available. The systems and methods prescribe the top category and/or product or the top categories and/or products that will be beneficial in optimizing employee ROI of an organization. The organization may be all employees of the employer, or the organization may be some subset of the employees of the employer, such as a work group, team, group of similarly situated employees, or the like. The systems and methods for prescribing the category and/or product or categories and/or products in some implementations provide an estimate of how employee ROI will be impacted by the prescribed recognition.

The systems and methods for ranking and prescribing recognition categories and/or products may be provided by the employer, or alternatively may be provided by the third-party recognition provider as part of the employer's subscription to the recognition program provided by the provider. The systems and methods for ranking and prescribing recognition categories of certain implementations may assist employers in selecting the types of recognition to be made available as part of the employer subscription package. In certain implementations, the system helps the employer or its employees select among the already subscribed and available recognition products that will be most beneficial in maximizing employee ROI. In some implementations, the system and method is tailored to maximize certain targeted aspects of employee ROI, and the suggested recognition category or product is selected based on the targeted aspect or aspects of employee ROI. Accordingly, certain implementations of the invention may be utilized to help employers to choose categories of recognition programs that will best suit their employee ROI requirements.

Certain implementations of the invention use historical and current data pertaining to the workforce and recognition program usage of an organization. Workforce data considered by certain implementations includes management structure, team structure, organizational performance metrics, employee churn rate, and the like, including subsets thereof. Recognition use data considered by certain implementations includes attributes associated with recognitions such as mode of recognition (e.g., electronic or tangible artifact), monetary values, reason for recognition, and the like, including subsets thereof.

Implementations of the system receive workforce data and recognition use data and output recognition categories ranked by the order of impact they exert on a selected aspect of employee ROI. The system of some implementations also outputs a metric establishing the quantitative relationship between each of the recognition categories and the selected aspect of employee ROI. The system of certain implementations has a separate subsystem for each aspect of employee ROI, whereby each ROI aspect has a separate ranking of the recognition categories. Accordingly, employers can select an aspect of ROI of interest and readily determine what recognition category will have greatest effect on that ROI aspect.

The system of some implementations utilizes machine learning algorithms and artificial intelligence techniques to receive the workforce data and the recognition use data and determine the various system outputs. The machine learning algorithms and artificial intelligence techniques of certain implementations utilize one or more sets of empirical data relating to workforce data, recognition use data, recognition categories and/or products, and recognition results to create associations that permit the machine learning algorithms and artificial intelligence techniques to provide each employer or organization with individualized predictions for maximal effect on employee ROI. Such individualized predictions are provided by implementations of the system with respect to each aspect of employee ROI with models trained on that employer's or organization's data, regardless of the extent of similarities or differences between each individual employer or organization to any other employers or organizations.

Implementations of the invention provide systems, methods, and non-transitory computer-readable media for maximizing employee ROI using a recognition program in which a plurality of recognition artifacts are available and ranked according to impact on a selected aspect of employee ROI. A method in accordance with implementations of the invention includes steps of determining a list of available recognition artifacts and determining an aspect of employee ROI to be maximized through employee recognition from a list of available ROI aspects. The method also includes steps of retrieving workforce data related to a plurality of employees within an organization from a database of workforce information containing human resources information system (HRIS) data and obtaining recognition program usage data relating to the plurality of employees within the organization from a database of historical data identifying employees recognized in the past using a recognition program. The method further includes steps of creating a set of associations between the workforce data and the recognition program usage data, engineering a plurality of engineered features capturing recognition traits of each of the plurality of employees within the organization, and storing the plurality of engineered features in an engineered feature database, thereby capturing and storing relationships between past recognition events and HRIS data for the plurality of employees within the organization. The method includes steps of using the plurality of engineered features in an artificial intelligence subsystem trained using one or more machine learning algorithms to rank the list of available recognition artifacts by order of expected impact on the determined aspect of employee ROI and predicting a recognition artifact having a maximal effect on the selected aspect of employee ROI for a particular employee within the organization.

In some implementations, the organization includes all employees of an employer. In some implementations, the organization includes a sub-group of fewer than all employees of an employer. In some implementations, the step of determining a list of available recognition artifacts includes identifying subscribed and available recognition artifacts from among a more-extensive selection of recognition artifacts. In some implementations, using the plurality of engineered features in an artificial intelligence subsystem includes incorporating a time delta function giving weight to a time span over which memory of past recognition transactions impacts employee ROI for a given employee. In some implementations, the method also includes a step of providing an estimate of the impact on the determined aspect of employee ROI of implementing a prescribed recognition program.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 4 shows an illustrative portion of an exemplary database structure of recognition program usage history data;

FIG. 5 shows an illustrative portion of an exemplary database structure of human resources information system (HRIS) data;

FIG. 6 shows how information from a database of recognition program usage history data can be used to engineer features for use in a machine learning employee recognition recommendation system;

DETAILED DESCRIPTION OF THE INVENTION

Figure 1:
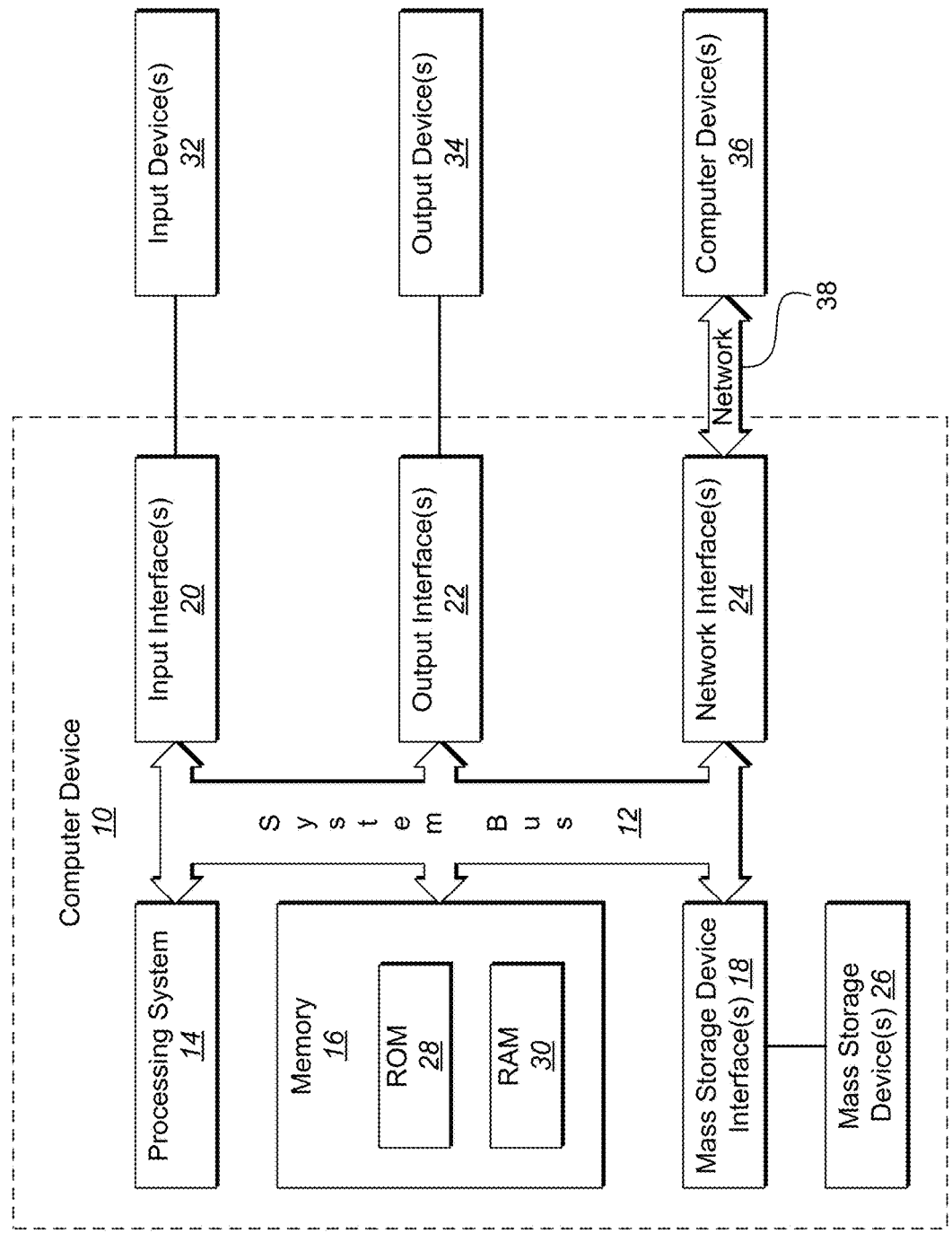
FIG. 1 shows a representative computer system for use with embodiments of the invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

Embodiments of the invention provide systems and methods for maximizing employee return on investment (ROI). Aspects of employee ROI that may be maximized include, without limitation, employee retention, employee performance, employee engagement, employee satisfaction, employee fulfillment, and the like. In particular, embodiments of the invention relate to utilization of recognition programs to maximize employee ROI. Recognition programs may include a variety of products and may include tangible and electronic artifacts. Recognition programs may be used by employers and other employees to commend employees for workplace contributions and wins, to congratulate employees on milestones, and to recognize events such as birthdays and other significant life events, as well as work anniversaries and other work events.

According to certain embodiments of the invention, an employee recognition program in which an employer and its employees participate may have a plurality of recognition categories and products. These recognition categories and products may be provided by a third party that provides recognition services to the employer. Accordingly, the employer may subscribe to a set of recognition products among the recognition products that are available from the recognition subscription service. The employer may select from among available recognition products those that the employer is willing to pay for and make available to its employees. In some instances, the employer may select to make all available recognition products available to its employees. In other instances, the employer may select a subset of available recognition products available to its employees. In some instances, the available recognition products include intangible recognition products such as electronic recognition products or artifacts. In other instances, the available recognition products include tangible recognition products that can be physically delivered to the employees. In further instances, the available recognition products include mixtures of intangible and tangible recognition products.

To maximize the ROI effect of the available recognition products at a desired cost to the employer, embodiments of the invention utilize systems and methods that rank recognition categories and/or products from among the available recognition categories and/or products selected by the employer to be available. The systems and methods prescribe the top category and/or product or the top categories and/or products that will be beneficial in optimizing employee ROI of an organization. The organization may be all employees of the employer, or the organization may be some subset of the employees of the employer, such as a work group, team, group of similarly situated employees, or the like. The systems and methods for prescribing the category and/or product or categories and/or products in some embodiments provide an estimate of how employee ROI will be impacted by the prescribed recognition.

The systems and methods for ranking and prescribing recognition categories and/or products may be provided by the employer, or alternatively may be provided by the third-party recognition provider as part of the employer's subscription to the recognition program provided by the provider. The systems and methods for ranking and prescribing recognition categories of certain embodiments may assist employers in selecting the types of recognition to be made available as part of the employer subscription package. In certain embodiments, the system helps the employer or its employees select among the already subscribed and available recognition products that will be most beneficial in maximizing employee ROI. In some embodiments, the system and method is tailored to maximize certain targeted aspects of employee ROI, and the suggested recognition category or product is selected based on the targeted aspect or aspects of employee ROI. Accordingly, certain embodiments of the invention may be utilized to help employers to choose categories of recognition programs that will best suit their employee ROI requirements.

Certain embodiments of the invention use historical and current data pertaining to the workforce and recognition program usage of an organization. Workforce data considered by certain embodiments includes management structure, team structure, organizational performance metrics, employee churn rate, and the like, including subsets thereof. Recognition use data considered by certain embodiments includes attributes associated with recognitions such as mode of recognition (e.g., electronic or tangible artifact), monetary values, reason for recognition, and the like, including subsets thereof.

Embodiments of the system receive workforce data and recognition use data and output recognition categories ranked by the order of impact they exert on a selected aspect of employee ROI. The system of some embodiments also outputs a metric establishing the quantitative relationship between each of the recognition categories and the selected aspect of employee ROI. The system of certain embodiments has a separate subsystem for each aspect of employee ROI, whereby each ROI aspect has a separate ranking of the recognition categories. Accordingly, employers can select an aspect of ROI of interest and readily determine what recognition category will have greatest effect on that ROI aspect.

The system of some embodiments utilizes machine learning algorithms and artificial intelligence techniques to receive the workforce data and the recognition use data and determine the various system outputs. The machine learning algorithms and artificial intelligence techniques of certain embodiments utilize one or more sets of empirical data relating to workforce data, recognition use data, recognition categories and/or products, and recognition results to create associations that permit the machine learning algorithms and artificial intelligence techniques to provide each employer or organization with individualized predictions for maximal effect on employee ROI. Such individualized predictions are provided by embodiments of the system with respect to each aspect of employee ROI with models trained on that employer's or organization's data, regardless of the extent of similarities or differences between each individual employer or organization to any other employers or organizations.

Embodiments of the invention provide systems, methods, and non-transitory computer-readable media for maximizing employee ROI using a recognition program in which a plurality of recognition artifacts are available and ranked according to impact on a selected aspect of employee ROI. A method in accordance with embodiments of the invention includes steps of determining a list of available recognition artifacts and determining an aspect of employee ROI to be maximized through employee recognition from a list of available ROI aspects. The method also includes steps of retrieving workforce data related to a plurality of employees within an organization from a database of workforce information containing human resources information system (HRIS) data and obtaining recognition program usage data relating to the plurality of employees within the organization from a database of historical data identifying employees recognized in the past using a recognition program. The method further includes steps of creating a set of associations between the workforce data and the recognition program usage data, engineering a plurality of engineered features capturing recognition traits of each of the plurality of employees within the organization, and storing the plurality of engineered features in an engineered feature database, thereby capturing and storing relationships between past recognition events and HRIS data for the plurality of employees within the organization. The method includes steps of using the plurality of engineered features in an artificial intelligence subsystem trained using one or more machine learning algorithms to rank the list of available recognition artifacts by order of expected impact on the determined aspect of employee ROI and predicting a recognition artifact having a maximal effect on the selected aspect of employee ROI for a particular employee within the organization.

In some embodiments, the organization includes all employees of an employer. In some embodiments, the organization includes a sub-group of fewer than all employees of an employer. In some embodiments, the step of determining a list of available recognition artifacts includes identifying subscribed and available recognition artifacts from among a more-extensive selection of recognition artifacts. In some embodiments, engineering a plurality of engineered features includes incorporating a time delta function giving weight to a time span over which memory of past recognition transactions impacts employee ROI for a given employee. In some embodiments, the method also includes a step of providing an estimate of the impact on the determined aspect of employee ROI of implementing a prescribed recognition program.

FIG. 1 and the corresponding discussion are intended to provide a general description of a suitable operating environment in which embodiments of the invention may be implemented. One skilled in the art will appreciate that embodiments of the invention may be practiced by one or more computing devices and in a variety of system configurations, including in a networked configuration. However, while the methods and processes of the present invention have proven to be particularly useful in association with a system comprising a general purpose computer, embodiments of the present invention include utilization of the methods and processes in a variety of environments, including embedded systems with general purpose processing units, digital/media signal processors (DSP/MSP), application specific integrated circuits (ASIC), stand alone electronic devices, and other such electronic environments.

Embodiments of the present invention embrace one or more computer-readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer-readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. While embodiments of the invention embrace the use of all types of computer-readable media, certain embodiments as recited in the claims may be limited to the use of tangible, non-transitory computer-readable media, and the phrases "tangible computer-readable medium" and "non-transitory computer-readable medium" (or plural variations) used herein are intended to exclude transitory propagating signals per se.

With reference to FIG. 1, a representative system for implementing embodiments of the invention includes computer device 10, which may be a general-purpose or special-purpose computer or any of a variety of consumer electronic devices. For example, computer device 10 may be a personal computer, a notebook or laptop computer, a netbook, a personal digital assistant ("PDA") or other hand-held device, a smart phone, a tablet computer, a workstation, a minicomputer, a mainframe, a supercomputer, a multi-processor system, a network computer, a processor-based consumer electronic device, a computer device integrated into another device or vehicle, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer-readable media, such as on memory 16, a solid state drive, a removable solid state drive, a magnetic hard disk, a removable magnetic disk, a magnetic cassette, an optical disk, or from a communication connection, which may also be viewed as a computer-readable medium.

Memory 16 includes one or more computer-readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include solid state drives, hard disk drives, magnetic disk drives, tape drives and optical disk drives. A mass storage device 26 may read from and/or write to solid state memory, a magnetic hard disk, a removable magnetic disk, a magnetic cassette, an optical disk, or another computer-readable medium. Mass storage devices 26 and their corresponding computer-readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), an integrated circuit, a firewire (IEEE 1394), or another interface. For example, in some embodiments input interface 20 includes an application specific integrated circuit (ASIC) that is designed for a particular application. In a further embodiment, the ASIC is embedded and connects existing circuit building blocks.

One or more output interfaces 22 may be employed to connect one or more corresponding output devices 34 to system bus 12. Examples of output devices include a monitor or display screen, a speaker, a printer, a multi-functional peripheral, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 2:
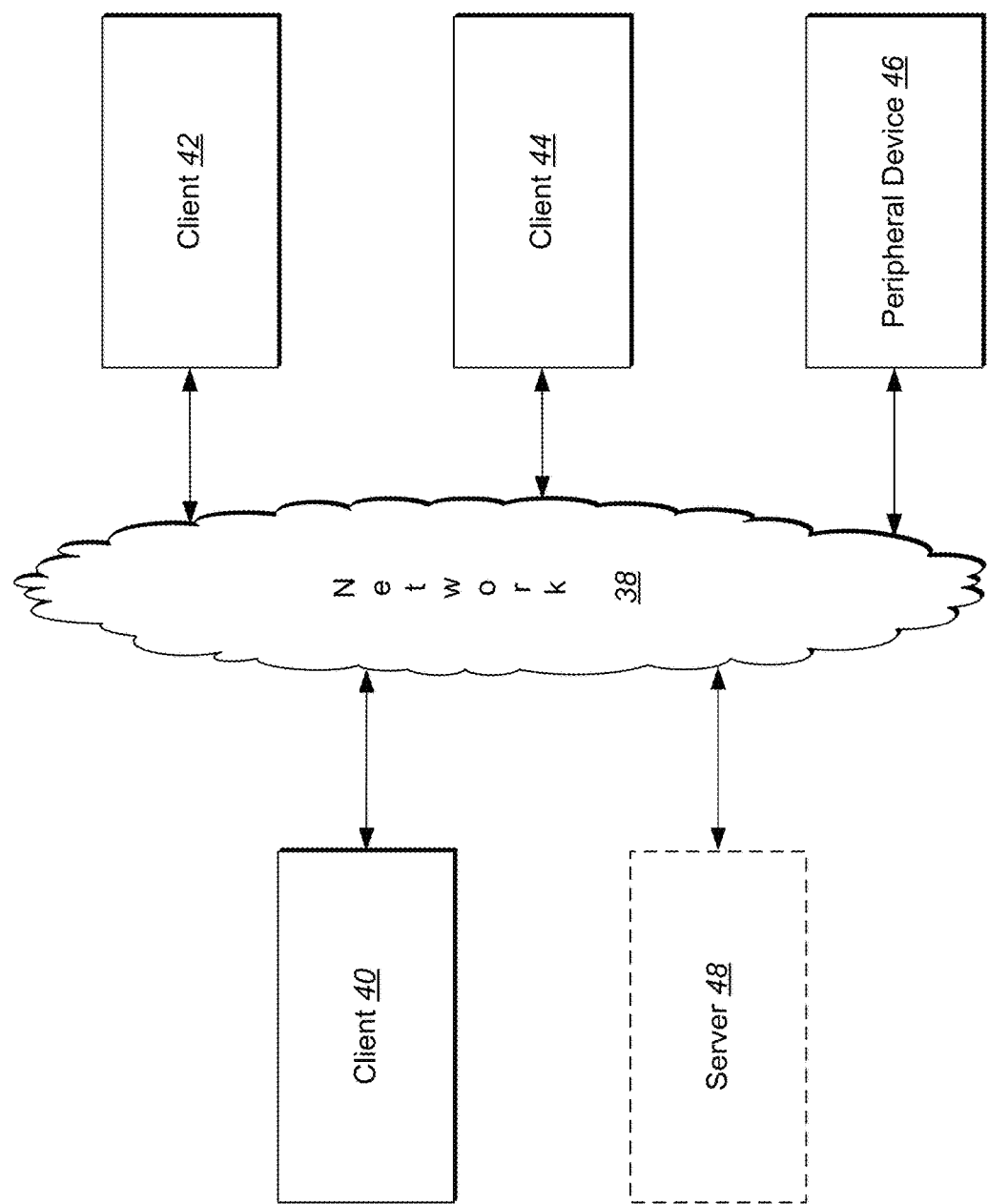
FIG. 2 shows a representative networked computer system in accordance with embodiments of the invention.

Thus, while those skilled in the art will appreciate that embodiments of the present invention may be practiced in a variety of different environments with many types of system configurations, FIG. 2 provides a representative networked system configuration that may be used in association with embodiments of the present invention. The representative system of FIG. 2 includes a computer device, illustrated as client 40, which is connected to one or more other computer devices (illustrated as client 42 and client 44) and one or more peripheral devices 46 across network 38. While FIG. 2 illustrates an embodiment that includes a client 40, two additional clients, client 42 and client 44, one peripheral device 46 (such as a multifunction peripheral device or printer that may be used to render or print a recognition), and optionally a server 48, which may be a print server, connected to network 38, alternative embodiments include more or fewer clients, more than one peripheral device, no peripheral devices, no server 48, and/or more than one server 48 connected to network 38. Other embodiments of the present invention include local, networked, or peer-to-peer environments where one or more computer devices may be connected to one or more local or remote peripheral devices. Moreover, embodiments in accordance with the present invention also embrace a single electronic consumer device, wireless networked environments, and/or wide area networked environments, such as the Internet.

Similarly, embodiments of the invention embrace cloud-based architectures where one or more computer functions are performed by remote computer systems and devices at the request of a local computer device. Thus, returning to FIG. 2, the client 40 may be a computer device having a limited set of hardware and/or software resources. Because the client 40 is connected to the network 38, it may be able to access hardware and/or software resources provided across the network 38 by other computer devices and resources, such as client 42, client 44, server 48, or any other resources. The client 40 may access these resources through an access program, such as a web browser, and the results of any computer functions or resources may be delivered through the access program to the user of the client 40. In such configurations, the client 40 may be any type of computer device or electronic device discussed above or known to the world of cloud computing, including traditional desktop and laptop computers, smart phones and other smart devices, tablet computers, or any other device able to provide access to remote computing resources through an access program such as a browser.

Figure 3:
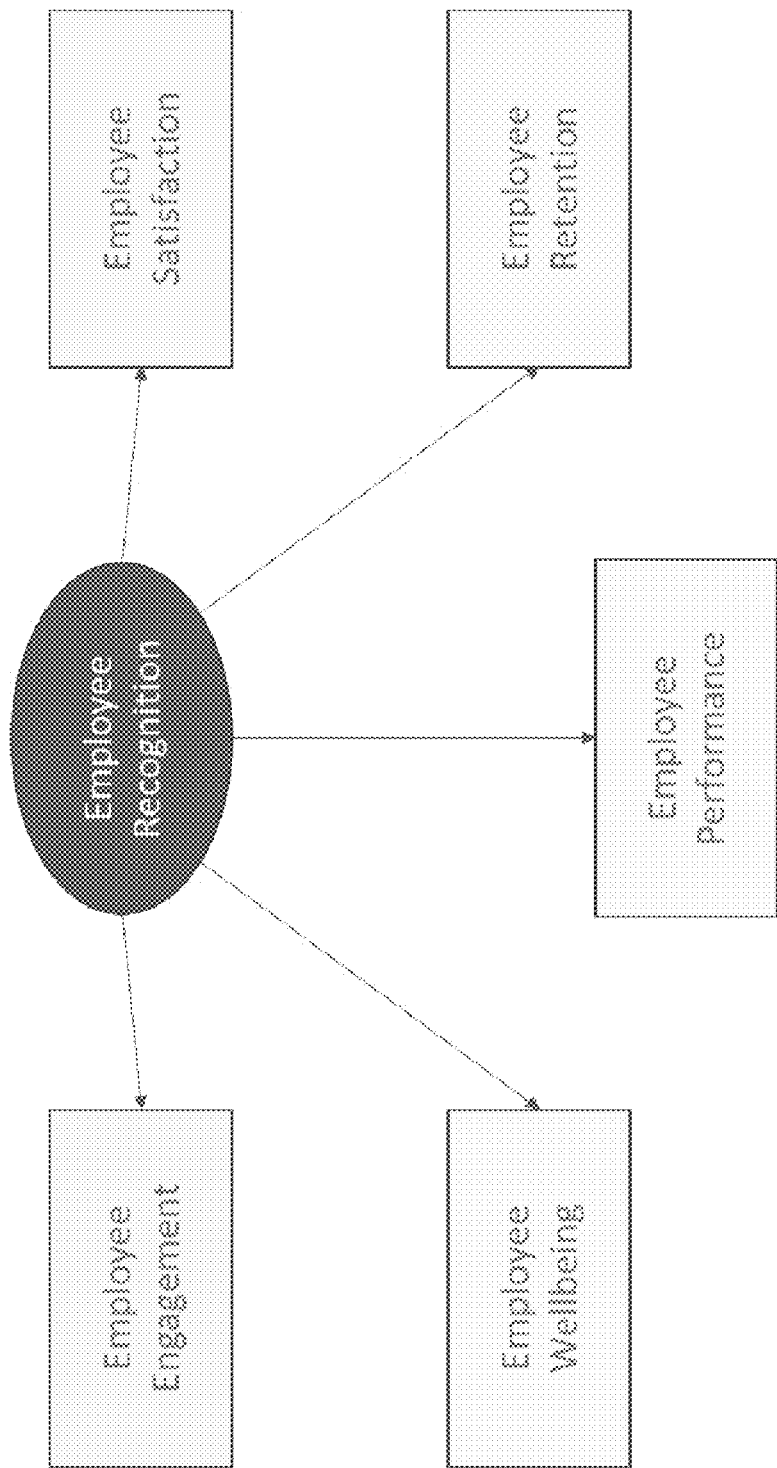
FIG. 3 illustrates aspects of employee return on investment (ROI) that may be impacted by properly targeted employee recognition efforts.

Embodiments of the invention utilize systems such as or similar to the computer systems illustrated in FIGS. 1 and 2 to provide features related to a recognition program to influence aspects of employee ROI. FIG. 3 illustrates certain aspects of employee ROI that may be impacted by employee recognition, such as employee engagement, employee satisfaction, employee wellbeing, employee retention, and employee performance. The aspects of employee ROI affected by employee recognition in accordance with embodiments of the invention may include aspects other than those illustrated in FIG. 3, including any aspect of employee ROI that may be desired by a particular employer or by a provider of employee recognition services and products.

According to certain embodiments of the invention, a provider of employee recognition services and/or products provides such services through a standalone computer program that is installed at an operable by the employer. The computer program in such embodiments may be a stock recognition program in some embodiments, and in other embodiments may be customized for the needs of the particular employer. As needed, the employer-side program may place orders for recognition products from the provider of employee recognition services and/or products.

According to alternate embodiments of the invention, a provider of employee recognition services and/or products provides such services through a server-side computer program that the employer (or employees of the employer) accesses through one of a variety of methods. In one type of embodiment, the employer accesses the server-side computer program through a web browser. In another type of embodiment, the employer accesses the server-side computer program through an employer-side access program adapted to connect to the server-side computer program through the network 38 (e.g., the Internet). As may be appreciated, providing the primary program on a server side may reduce the computing resources necessary on the part of the employer. As with the employer-side program, the employer may place orders for recognition services and/or products through the server-side computer program.

The provider of employee recognition services and/or products may earn revenue from any recognition products and/or services ordered by the employer or its employees through the system. Additionally, in some embodiments, the provider of employee recognition services and/or products may earn revenue from a subscription agreement providing access and use rights of the computer program. In some embodiments, the provider may earn revenue from instances where the system provides recommendations regarding particular types of employee recognition deemed most effective in maximizing one or more aspects of employee ROI, such as those illustrated in FIG. 3.

Regardless of where the recognition program is implemented and whether the recognition program is implemented in a localized or distributed fashion, the recognition program utilizes predictive and prescriptive models to leverage existing and future employee recognition practices to increase employee ROI. These models predict the impact of a recognition and prescribe or recommend recognitions to increase as many aspects of employee ROI as the employer may desire or select. The models used can be employer-specific, employee-specific, organization-specific, and the like, so each client of the provider and each organization within the employer has customized predictions and recommendations for recognitions to improve employee ROI.

According to embodiments of the invention, the provider is able to provide each employer with a menu of available recognition artifacts. The employer can then select from the menu of available recognition artifacts those that the employer wishes to make available for recognition of its employees. Accordingly, each employer may select a differing range of recognition artifacts, and the recognition program implemented at each employer may differ or be customized according to the recognition artifacts made available at that employer.

The recognition artifacts may include a variety of tangible and intangible artifacts. Representative examples of tangible artifacts include certificates of recognition, commemorative plaques, physical gift certificates, cards, letters of accomplishment, tangible trophies and awards, physical gifts of any size, variety, or value, special meals or food items, and the like. Tangible artifacts in accordance with some embodiments may optionally be personalized with respect to the employer and/or employee, with respect to the reason for recognition, and/or with respect to the person or persons who nominated the employee for recognition. In some instances, tangible recognition artifacts may be printed on site, such as at a printer or other peripheral device located at the employer. In some instances, the employer may maintain a stock on hand of tangible recognition items intended to be distributed to employees. In other instances, tangible recognition artifacts may be provided to the employer on demand by the recognition provider.

Representative examples of intangible artifacts include audible announcements provided over an employer announcement system or at an employer social function, recognition emails to the employee or employer-wide recognizing the employee or the employee's achievement, electronic gift certificates of any variety, monetary awards, and the like. Intangible artifacts, including electronic artifacts may be personalized to the same or greater extent as may be the tangible recognition artifacts. Intangible recognition artifacts may be provided to the recognized employee either by the employer or by the recognition provider.

The various recognition artifacts may be used by employees, managers, and/or the employer to commend one another/employees on workplace contributions and successes. The recognition artifacts may also be similarly used to congratulate one another/employees for milestones such as work anniversaries, birthdays, and other life events such as marriage or having a baby. The foregoing examples of reasons for recognition should be understood as being illustrative and not restrictive, and embodiments of the system can be used to recognize employees for any desired reason.

Figure 4:
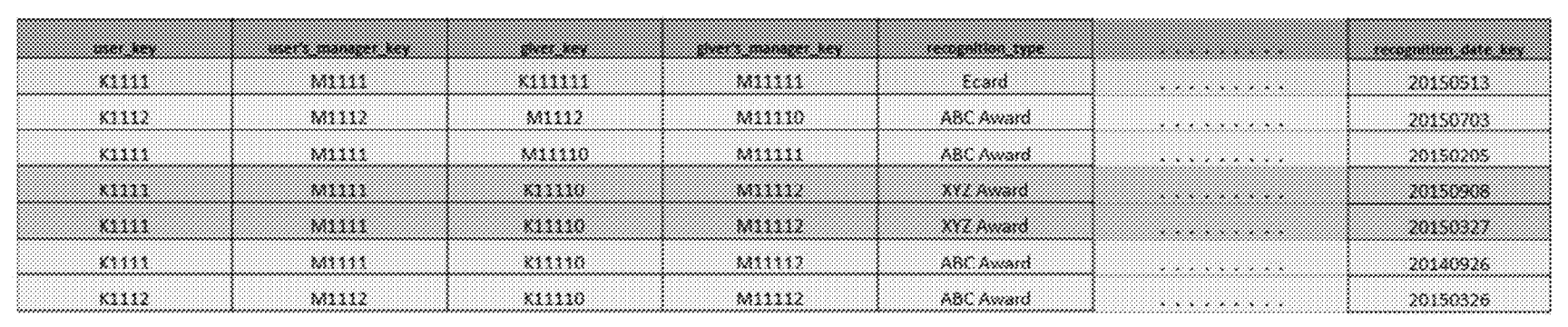

According to embodiments of the invention, the system track and utilize historical and current data pertaining to the workforce and the recognition program usage of an organization. This information may be stored in a database, such as the database structure illustrated in FIG. 4. The illustrative database structure illustrated in FIG. 4 is intended to be representative of one exemplary database structure, and is partial in nature. Accordingly, the database structure of FIG. 4 includes additional columns that are not shown, and may have any number of rows necessary to maintain a record of recognition program usage of an organization. Alternate database structures are embraced by embodiments of the invention. An organization may be an employer and all the employer's employees, or it may be a smaller organization within an employer.

The illustrative database structure of FIG. 4 includes a column for a user key, which in this example identifies the recipient of a recognition. The structure also includes a column for a user's manager key, which in this example identifies the manager of the recipient of the recognition. The structure further includes a column for a giver key, which in this example identifies a giver of the recognition. The structure also includes a column for a giver's manager key, which in this example identifies a manager of the giver of the recognition. The structure includes a column for a recognition type, which identifies the recognition given to the recipient of the recognition. In addition to not-shown columns, the structure further includes a column for a recognition date key that in this example identifies the date of the recognition. Other columns are used to record any other desirable information to permit maintenance of records of recognition program usage. By way of example only, additional columns could represent data such as recognition value, whether the recognition included tangible or intangible recognition elements, whether the recognition was associated with other recognitions, whether the recognition was given by more than one giver, additional giver keys, additional manager keys, mode of recognition, reasons for recognition, and the like. Exemplary recognition transaction data fields may include unique employee IDs, recognition date, recognition receiver user key, recognition giver user key, recognition giver business unit, recognition receiver business unit, recognition monetary value, recognition corporate value, recognition program value, recognition type, recognition mode, reasons for recognition (e.g., text data), recognition award level, recognition giver manager hierarchy, recognition access code, other users associated with the same recognition, parent business unit associated with the recognition receiver user key, and the like.

Embodiments of the system also track and utilize human resources information system (HRIS) data to obtain ROI indicators. Such information may also be stored in a database, such as the database structure illustrated in FIG. 5. As with the database structure of FIG. 4, the database structure illustrated in FIG. 5 is intended to be representative of one exemplary database structure, is partial in nature (some columns and/or rows are not shown), and is not intended to be limiting of a particular database structure. The database structure of FIG. 5 includes any HRIS data that may be useful in determining a most effective recognition for each employee to maximize a desired aspect of employee ROI.

The database structure of FIG. 5 includes a column for a user key, which key identifies a potential recipient of a recognition (an employee of the employer). The structure also includes a gender column and an age column identifying the gender and age of each potential recognition recipient. The structure further includes columns relating to the potential recipient's work: a salary column containing information regarding the potential recipient's salary and a years of service column identifying the number of years the potential recipient has been employed by the employer. Other columns (not shown) may include any relevant HR-related data, including performance reviews (positive or negative), benefits, productivity metrics, goals, training, information relating to management structure of the employer, team structure, organizational performance metrics, employee churn rate, hire date, salary history, job description keys, and the like. Examples of HRIS data fields may include unique employee IDs, type of employment (hourly/regular/temp), salary (monthly pay), hire date, termination date, termination type (voluntary/involuntary), reasons for termination, performance indicators, rehire employee (yes/no), job description, domain/industry of the company/employee, employee address, employee language, employee ethnicity, employee gender, employee education/education level, and the like.

Using information from the recognition program usage database (e.g., FIG. 4) and the HRIS database (e.g., FIG. 5), the system may be used to engineer features that capture the recognition traits of each user of an organization. The features are constructed so as to be tied to an actionable business practice that can be taken by the employer. Depending on the recognition product suite selected by the employer from the menu of available recognition options, and depending on the richness of the HRIS data provided by the employer, potentially millions of features can be mapped onto the feature space. As not all attributes may be reliable and unique for each organization, during engineering of the features, a deep dive of the program usage and HRIS data may be performed to discern the employer's organizational structure, values, and its recognition ethos. Using the information gleaned from the deep dive or using statistical hypothesis tests, or both, unique and relevant features will be created for each organization.

The feature engineering process of some embodiments receives as inputs HRIS data and recognition data for a given period of past time. From this HRIS and recognition data, actionable insights can be determined. Specifically, raw data is examined for actionable signals relating to effective recognition efforts and their relationship to employee ROI. By way of example, the system may identify the recipient of each act of past recognition along with the source of the recognition, and appropriate associated measures of employee ROI (e.g., employee retention, employee performance, employee satisfaction, etc.) and establishes associated metrics. According to some embodiments, patterns of usage are recognized both with respect to individual recipients as well as with respect to the company as a whole. Corporate structure is examined in some embodiments, so as to be able to determine the effect of employee siloing and other similar effects.

As may be recognized, when implementing embodiments of the invention with respect to large organizations (e.g. large corporations or large divisions within a corporation), there may be very large amounts of data to process. According to some embodiments, a filtering process may be applied so as to separate strong recognition effects signals from weak ones. The filtering process may involve the application of a plurality of statistical tests to eliminate less-relevant information. Accordingly, as these strong signals are passed to machine learning and artificial intelligence systems of embodiments of the invention, the process avoids being slowed by processing of up to millions of weak signals.

To facilitate testing of the effectiveness of the feature engineering and predictive process, a portion of the original HRIS data, the original recognition data, outcome data, and any other associated data may be held back from the original feature engineering and later machine learning and artificial intelligence techniques. Then, as the features are engineered and the machine learning process occurs with respect to the initial data set, the held-back information can be used to test the predictive value of the results of the feature engineering, machine learning, and artificial intelligence techniques. The predictive engine can then be further refined for implementation, and as the system moves forward, employee ROI results from predictive and prescriptive efforts can be used to further refine the engineered features, machine learning techniques, and artificial intelligence processes and techniques to further improve the predictions of the system for maximal employee ROI through applied employee recognition program usage.

FIG. 6 illustrates one exemplary manner in which features may be engineered from the recognition program usage data (in other examples, not shown in FIG. 6, the features are additionally engineered using the HRIS data). In this example, features are engineered using data from a recognition transaction database relating to a single user (identified by user key K1111 in FIG. 6). The engineered features are used to populate an engineered feature database, with entries relating to the engineered features. The engineered features may take into account significantly more data in some instances than can be readily shown in the simplified view of FIG. 6.

In FIG. 6, one engineered feature (labeled "from_manager_same_unit_ABC_Award") indicates that the employee's manager appreciated the employee's work. Another engineered feature (labeled "from_employee_different_unit_ABC_award") represents that an employee from a different organizational unit, who happens to be the manager of the employee's manger, appreciated the employee's work, and did so by giving them an "ABC" award. Another engineered feature (labeled "from_employee_different_unit_XYZ_award") represents that a coworker from a different organizational unit gave the employee an XYZ award. Another engineered feature (labeled "from_peer_same_unit_Ecard") recognizes that a coworker from the employee's organizational unit recognized the employee's contribution. As may be noted in FIG. 6, the entries in the engineered feature database may represent a number of times an employee has been recognized with respect to that engineered feature.

Other examples of engineered features include a number of ecard recognitions that express corporate value of "great work" that are received by an employee from the employee's manager, a number of "ABC" (meaning a particular recognition designation, whatever it may be) nominations that qualify as "above and beyond" work given by an employee to a peer who works in a particular team, a number of ecard recognitions received from peers in the same business unit who are not under the same manager, and a number of "ABC" recognitions received from manages who are not managers of that employee and are part of a different business unit. As may be seen from these examples, the engineered features may effectively capture any relationship between recognition events and HRIS data.

Figure 7:
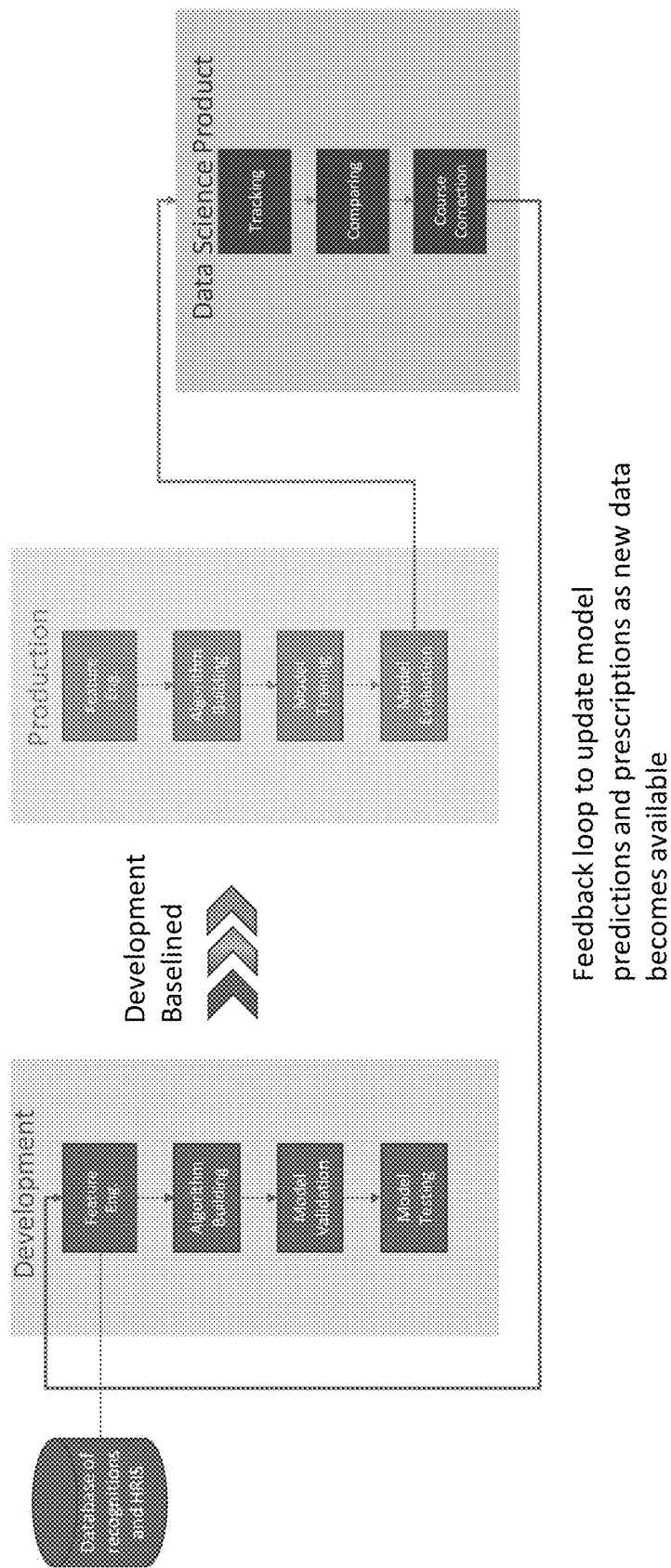
FIG. 7 illustrates aspects of an exemplary machine learning/artificial intelligence system and process for receiving recognition program usage history data and/or HRIS data and outputting recognition categories determined to have a greatest impact on selected aspects of employee ROI.

In some embodiments, the engineered features are then fed into an ensemble of machine learning algorithms adapted to create a model to output recognition categories ranked by order of impact they exert on any given aspect of employee ROI (e.g., those aspects illustrated in FIG. 3). FIG. 7 illustrates a representative machine learning/artificial intelligence building method for creating the machine learning associations whereby the system learns to output recognition categories ranked by order of impact on desired aspects of employee ROI. The system, in the development phase, initially receives as input information from the database(s) of recognition program usage data and HRIS data, whereupon the features are engineered as discussed previously. The system may have a plurality of subsystems each dedicated to a separate aspect of employee ROI (e.g., a retention rate subsystem may be dedicated to prescribing recognition categories that are beneficial for increasing employee retention rate), which may facilitate parallel processing of the incoming data to generate the ranking of recognition categories maintained separately to permit consideration of each aspect of maximizing employee ROI.

Development continues as the engineered features are used to build the machine learning algorithms that will be used to provide recommendations for maximizing employee ROI through the recognition program. The model is validated using a validation dataset and this process of validation and testing may be an ongoing process as the model and system are developed. Once development reaches a baseline performance level, the system may move into production, where features are engineered with respect to new recognition usage and HRIS data. In this case, algorithms are built utilizing the menu of recognition options selected by the employer, as well as the recognition program usage information and HRIS data of the employer. The model is trained and evaluated to ensure peak performance.

To ensure that the model performs adequately, the system may be continually evaluated. The system and its recommendations/prescriptions can be tracked and results compared to ensure that desired employee ROI results are being achieved. As inevitable discrepancies are identified, improvements may be incorporated into the machine learning algorithms and feature engineering procedures through a feedback loop to ensure evolution and improvement of the machine learning/artificial intelligence system. Accordingly, system recommendations, including ranking of recommendation categories based on order of impact on given aspects of employee ROI as well as the determined metrics of quantitative relationships between each recognition category and each aspect of employee ROI, can be relied on to predict the impact on desired aspects of employee ROI. Employers can then use this information to select recognition program artifacts that best suit their employee ROI requirements.

Figure 8:
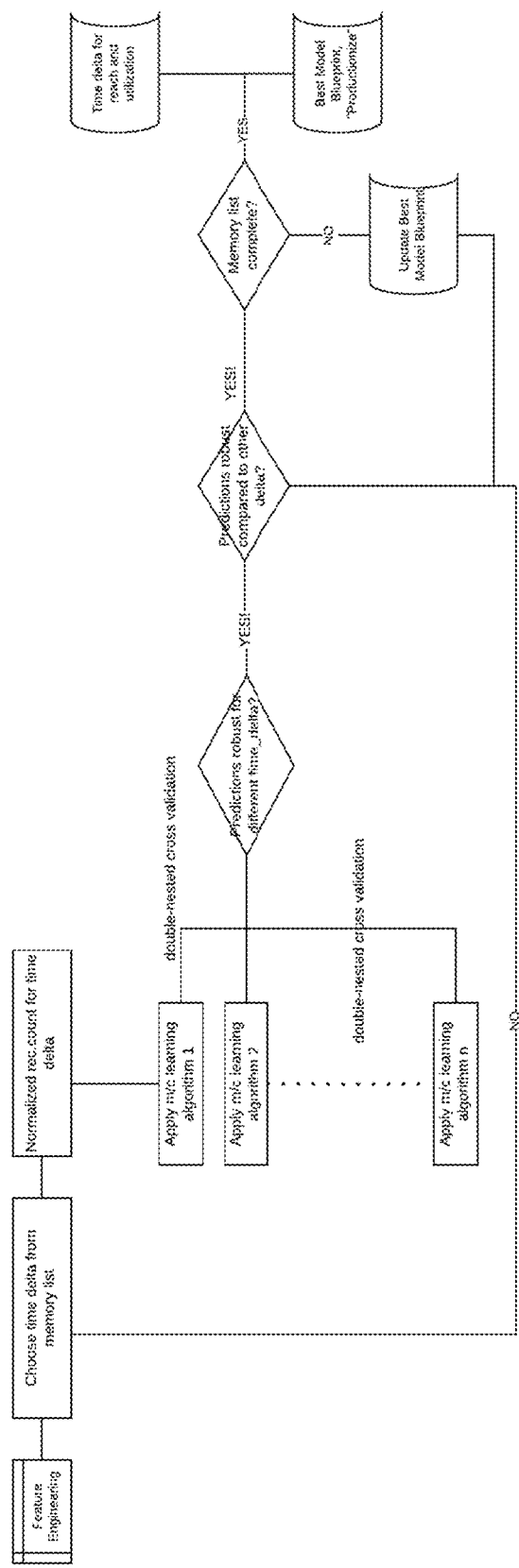
FIG. 8 illustrates an exemplary process for machine learning to predict and prescribe employee recognition efforts for maximizing aspects of employee ROI.

As illustrated in FIG. 8, the machine learning system can incorporate a time delta function related to the estimated time span over which memory of recognition transactions impacts a given employee ROI. The illustrated pipeline tests for all time deltas and uses validation tests to pick the delta most relevant to the organization for making predictions. Accordingly, the system avoids giving too much weight to past recognition events as time lessens the recognition's impacts. Based on the time delta evaluations, the best model of the employee recognition program and its recommendations/prescriptions can be updated for maximum effectiveness.

The machine learning and Artificial Intelligence (ML/AI) subsystem takes-in the engineered features and ROI metrics, and constructs prediction and prescription pipelines which provide the top N recognition types that impact a given ROI, and outputs a quantifiable relationship between these recognition types and the ROI metric. The ML/AI subsystem comprises of implementations of algorithms such as artificial neural network (ANN), convolutional neural network (CNN), K-nearest neighbors (KNN), Random Forests, Word2Vec, etc. Based on the engineered features, some or all algorithms in this ML/AI subsystem may be applicable to construct the prediction & prescription pipelines. Using the algorithms that are deemed applicable, several algorithmic ensembles or models will be constructed. These models may be constructed using all combinations and permutations of the applicable algorithms, with these algorithms blended both linearly and non-linearly.

Once these models are constructed, each of them will be trained on the engineered features and the ROI metrics of an organization to calculate the model coefficients or weights. These model coefficients will ascertain the importance of the features, as well as quantify the relationship between each of the feature and the ROI metric. These model coefficients when combined with the features will output the ROI metric.

The top N features ascertained from the training process and their corresponding weights will be used to predict the ROI metric for the validation data (this is the data that will be kept aside and not used during the model training process). This process of model training and validation is repeated for all the time deltas and for all the models constructed from the original features. The model and time delta whose predictions correspond to the lowest errors on the validation and training data, where errors are calculated as a mathematical function that computes the difference between the predicted and the measured ROI metric, will be used in the production environment. The time delta and the weights of the baselined model will be used to determine the top N features and to quantify the relationship between the features and the ROI metric for all the new data that will be made available in the production system.

These predictions made in the production system are again monitored and the difference between predictions and measured ROI are ascertained and this knowledge is fed back into the model training process to fine tune the predictions further. The feedback is also connected to the feature engineering system which might result in discarding existing features or engineering new features.

By way of example, a subsystem may be dedicated to predicting and prescribing employee recognition for increasing employee retention (as an aspect of employee ROI). According to certain embodiments, each recognition transaction is mapped to an individual employee's retention rate. A longitudinal machine learning algorithm is assembled to predict the impact of recognition traits on employee retention and to prescribe/recommend the recognition artifacts predicted by the machine learning model. The system then determines the top "N" features that are predictive of employee churn rate and predicts how changing each of these features impacts the odds of an employee leaving or staying.

By way of example, the system might determine that the top 10 features that increase employee retention are: 1) a number of "ABC" recognitions that are received from a manager in the same business unit, 2) a number of ecards send to peers from the same business unit, 3) a number of "XYZ" recognitions from a manager from a different business unit, 4) a number of ecard recognitions from peers from the same business unit, 5) a number of ecard recognitions from peers from different business units, 6) a number of "XYZ" recognitions from any manager, 7) a number of ecard recognitions from any manager, 8) a number of ecards received from peers from different business units, 9) a number of ecards received from peers from the same business unit, and 10) a number of "ABC" recognitions from managers from the same business unit but who are not the employee's manager.

A determination is made regarding the impact of employee recognition on employee retention, with recognition recommendations being made accordingly. By way of example, one recommendation might be increasing the number of "ABC" recognitions by one unit from managers of the same business unit will increase the odds of an employee staying by 14%. Another recommendation might be that an increase in the number of ecards sent to peers from the same business unit by one unit increases the odds of an employee staying by 6%. A third recommendation might be that an increase in the number of "XYZ" recognitions received by an employee from a manager from a different business unit increases the odds of an employee staying by 17%. The employer can then use this information to make decisions about how best to utilize recognition to maximize the likelihood of retaining the employee.

Other related predictions can also be incorporated into the system. By way of example, one facet that can be impacted by recognition efforts is intra-company migration. Recommendations of recognition practices can be made to maximize employee advancement to affect how the employee moves up and across the chain of command. As another example, industry specific recognition benchmarks may be incorporated into the system, whereby trends and metrics that describe employee characteristics and recognition characteristics by industry or vertical are recognized and used for making recommendations.

Accordingly, embodiments of the present invention provide systems and methods for using targeted and recommended recognition programs to maximize aspects of employee ROI. The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A method for maximizing employee return on investment (ROI) using a recognition program in which a plurality of recognition artifacts are available and ranked according to impact on a selected aspect of employee ROI, the method performed by at least one processor and comprising:
   providing, from a store of available recognition artifacts maintained on a network-connected server, a list of available recognition artifacts to an employer for selection for inclusion in an employee recognition program;
   determining a list of subscribed recognition artifacts which the employer is willing to subscribe to from a third-party subscription provider operating the server by receipt of electronic inputs from a computer system operated by the employer, the list of subscribed recognition artifacts being derived from both tangible and electronic artifacts for delivery to employees;
   determining a targeted aspect of employee ROI to be maximized through employee recognition from a list of available ROI aspects, the list of ROI aspects being maintained on the server and dynamically displayed to the employer and for selection among by the employer;
   retrieving workforce data related to a plurality of employees within an organization from a database on the server of workforce information containing human resources information system (HRIS) data, management structure and organizational performance metrics;
   obtaining recognition program usage data relating to the plurality of employees within the organization from a database of historical data identifying employees recognized in the past using a recognition program, including mode of recognition data, monetary data and reasons for recognition;
   applying a filtering process to separate strong recognition effects signals from weak recognition effects signals to hasten machine-learning determination of impact of recognition categories on aspects of employee ROI;
   creating a set of associations between the workforce data and the recognition program usage data using one or more machine learning algorithms operating on the server for the targeted aspect of employee ROI selected by the employer;
   creating recognition categories ranked by the order of impact the recognition categories exert on the targeted aspect of employee ROI;
   engineering a plurality of engineered features capturing recognition traits of each of the plurality of employees within the organization;
   storing the plurality of engineered features in an engineered feature database, thereby capturing and storing relationships between past recognition events and HRIS data for the plurality of employees within the organization;
   using the plurality of engineered features in an artificial intelligence subsystem of the server to train the one or more machine learning algorithms to rank the list of subscribed recognition artifacts by order of expected impact on the determined targeted aspect of employee ROI;
   calculating an error associated with a prediction by the one or more machine learning algorithms, the error representing a difference between a predicted ROI metric and a measured ROI metric;
   based on the calculated error, providing feedback to the artificial intelligence subsystem to discard existing features or engineer new features used to train the one or more machine learning algorithms and fine tune the prediction;
   incorporating a time delta function giving weight to a time span over which memory of past recognition transactions impact employee ROI for a given employee;
   predicting a set of recognition artifacts that will have a maximal effect on the targeted aspect of employee ROI for a particular employee within the organization based on output of the artificial intelligence subsystem using the trained one or more machine learning algorithms and incorporating the time delta function to reduce weight over time of past recognition events;
   predicting an amount of impact of a change to at least one recognition artifact of the set of recognition artifacts;
   providing a recommendation to the employer, wherein the recommendation includes the at least one recognition artifact and the amount of impact of the change to the at least one recognition artifact.

2. The method as recited in claim 1, wherein the organization comprises all employees of an employer.

3. The method as recited in claim 1, wherein the organization comprises a sub-group of fewer than all employees of an employer.

4. The method as recited in claim 1, wherein the step of determining a list of subscribed recognition artifacts comprises identifying subscribed and available recognition artifacts from among a more-extensive selection of recognition artifacts.

5. The method as recited in claim 1, further comprising providing an estimate of the impact on the determined targeted aspect of employee ROI of implementing a prescribed recognition program.

6. The method as recited in claim 1, further comprising receiving selection of a tangible recognition artifact and executing instructions to cause a tangible recognition artifact to be printed on site of the employer for distribution using a printer at the site of the employer.

7. The method as recited in claim 1, wherein the server comprises a plurality of artificial intelligence subsystems configured to process in parallel separate aspects of maximizing employee ROI whereby the server generates a ranking of recognition categories maintained separately to permit comparative consideration of each aspect of maximizing employee ROI.

* * * * *